United States Patent [19]

Bouvier et al.

[11] 4,170,038

[45] Oct. 2, 1979

[54] APPARATUS FOR SELECTIVE CONTROL OF INFORMATION BETWEEN CLOSE AND REMOTE STATIONS

[75] Inventors: Claude J. Bouvier, Nogent; David J. Smithson, Buc; Jean-Paul Luais, Fontenay, all of France

[73] Assignee: Compagnie Honeywell Bull, Paris, France

[21] Appl. No.: 652,315

[22] Filed: Jan. 26, 1976

Related U.S. Application Data

[63] Continuation-in-part of Ser. No. 521,021, Nov. 5, 1974.

[30] Foreign Application Priority Data

Jan. 29, 1975 [FR] France ................................ 75 02801

[51] Int. Cl.² .................................................. G06F 3/04
[52] U.S. Cl. .................................................. 364/200
[58] Field of Search ........................ 340/172.5; 445/1; 364/200 MS File, 900 MS File

[56] References Cited

U.S. PATENT DOCUMENTS

| | | | |
|---|---|---|---|
| 3,253,262 | 5/1966 | Wilenitz et al. | 364/200 |
| 3,363,234 | 1/1968 | Erickson et al. | 340/172.5 |
| 3,445,822 | 5/1969 | Driscoll | 364/200 |
| 3,560,934 | 2/1971 | Ernst et al. | 364/200 |
| 3,634,830 | 1/1972 | Baskin | 364/200 |
| 3,702,462 | 11/1972 | England | 340/172.5 |
| 3,921,148 | 11/1975 | Ophir et al. | 340/172.5 |
| 3,940,743 | 2/1976 | Fitzgerald | 364/200 |
| 3,964,055 | 6/1976 | Carruet et al. | 364/200 |

Primary Examiner—Melvin B. Chapnick
Attorney, Agent, or Firm—Lowe, King, Price and Becker

[57] ABSTRACT

Information is selectively exchanged between a number of closely located stations and a number of remote stations. Signals are coupled between the close stations via a first, parallel data channel. A second, serial data channel connects a common adapter circuit for the closely located stations to the remote stations. Each of the stations includes a data module for coupling signals between the first data channel and plural peripheral devices at the station. Each of the modules includes a data processing unit having a memory that stores a program dependent on the configuration of the peripheral devices at the station. Each of the data processing units derives an enabling order for a module at another station, which enabling order is coupled to the another station via the first station or via the first station, the adapter circuit and the second channel; the enabling orders cause the programs stored in the memories to be executed. Signals are exchanged between the data processing units in response to a succession of information exchange controls by the modules of all of the stations.

8 Claims, 7 Drawing Figures

APPARATUS FOR SELECTIVE CONTROL OF INFORMATION BETWEEN CLOSE AND REMOTE STATIONS

RELATION TO CO-PENDING APPLICATION

The present application is a continuation-in-part of and improvement on systems of the type disclosed in Ser. No. 521,021, filed on Nov. 5, 1974 for "Device For Selective Exchange Of Information" and relates to an improvement on control modules for information transferred between remotely and closely spaced stations containing data emitters and receptors.

BACKGROUND OF THE INVENTION

Previously, a system has been developed for the selective exchange of information between a group of n stations, each of which includes emitting and receiving members, wherein a channel connects the various stations and means are provided for controlling the transfer of information between the emitting and receiving members. The control means is formed by a group of n station control modules each of which is connected between the connecting channel and respective stations; each of the modules being formed by a processing unit and an associated memory to process data at each of the stations. The resulting information processing system at each station processes the information which is exchanged between the members of the station and those of other stations. One particular system of this type is disclosed in the previously mentioned application.

The connecting channel described in the previously mentioned application is a standard means of interconnecting the modules. The channel is not controlled by one specific module, but is controlled by each module in turn. This method of connection between modules makes it possible to attain high speeds of data transfer; the use of bidirectional receivers connected to the connecting channel allows data to be transferred over long distances. In FIG. 2 of the previously mentioned application, information is transferred in the form of a message from an adapter circuit (designated as ABj) which is located at one station and enables the connecting channel to be connected to a module (MOj) at that station, to an adapter circuit ABj which is located at another station and which enables the connecting channel to be connected to module MOj at the another station. The messages transmitted and received by a station are controlled by software and logic means of a connection controller (Cj) at each station. The transfer of data can only be initiated by a station which has command of the connecting channel. Two kinds of transfers are possible:

1. The transfer of data from a command station of a slave station, and
2. The transfer of data from a slave station to a command station.

Two modes of transfer are permitted:

1. The normal mode, involving transferring data from one station to another station, and
2. The "shared" mode involving distributing the data from one station to all the other stations.

A station cannot refuse to hand over command of the connecting channel to another station. It is open to a station which has command to initiate the transfer of a message to or from another station or other stations. If no transfer is requested or if a transfer has been completed, the station which has command is obliged to yield command of the connecting channel to the next station.

The system described in the previously mentioned application meets the requirements mentioned above satisfactorily and is well suited to the transmission of data between remote stations. On the other hand, this solution becomes expensive when the stations are closely spaced. In the arrangement described in the previously mentioned application, adapter circuit ABj is duplicated as many times as there are stations situated close together. It is therefore an object of the present invention to provide an arrangement which employs only one adapter circuit ABj for enabling a connecting channel to communicate with all of the stations of a group of closely spaced stations, wherein the logic of the modules associated with each of the stations may remain the same and which does not alter the characteristics of inter-station dialogues.

BRIEF DESCRIPTION OF THE INVENTION

In accordance with the present invention, a single adapter circuit FEL is used with multiple closely located stations by providing a local connecting channel which connects all the controllers DPCJ in each of the closely located stations to the adapter circuit. In order for the system of the present invention to retain all of the capabilities of the system described in the previously mentioned application, the local connecting channel has the following characteristics:

the local connecting channel allows data to be transferred between stations which are both close together and far apart, the rate of transmission along the local connecting channel is the same as along the connecting channel which connects the sets of remote stations, the local connecting channel is totally ignored by software at each station, and dialogues between the modules associated with the stations are always the same regardless of the station; and the local connecting channel is controlled entirely by an adapter circuit and in no case does it become involved with the module logic.

Since the way in which a local connecting channel having the characteristics set forth above may be produced is not self evident, the following description, which refers to the accompanying drawings, enables the original nature of such an arrangement to be better appreciated.

BRIEF DESCRIPTION OF THE DRAWINGS

FIGS. 6A and 6B, together, are a circuit diagram of the transmission circuits of the logic adapter FEL which is the subject of the present invention.

DETAILED DESCRIPTION OF THE DRAWINGS

Figure 1:
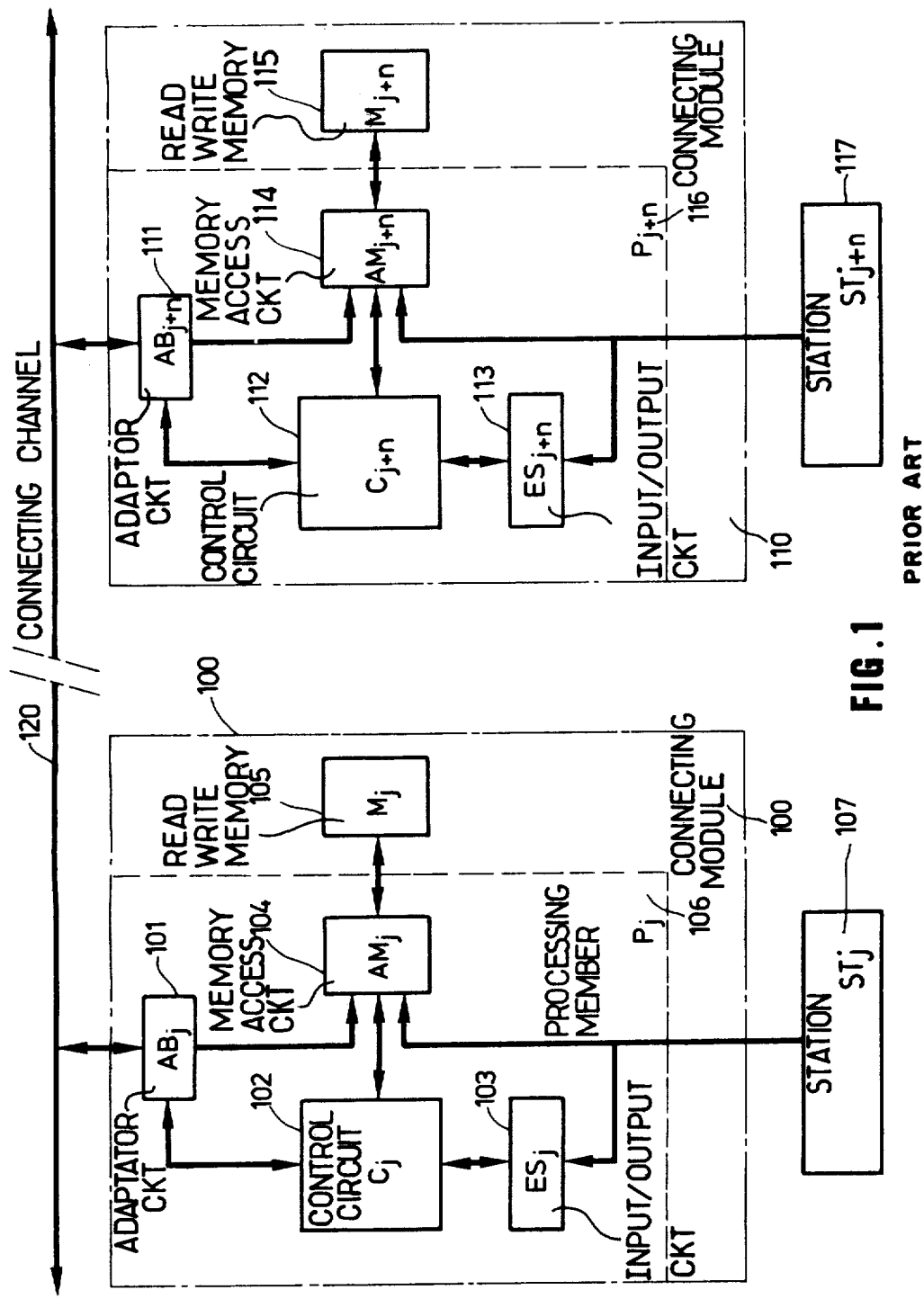
FIG. 1 is a block diagram of a prior art noncentrally controlled data-processing installation.

In the non-centrally controlled data-processing installation shown in FIG. 1, connecting channel 120 connects together a plurality of stations such as STj (107) and STj+n (117). While the number of stations so connected is indeterminate, a description of the apparatus for connecting only stations 107 and 117 will suffice for the remainder. Station STj 107 is connected to connecting channel 120 via a connecting module 100 and station STj+n is connected to connecting channel 120 via connecting module 110. All the modules associated with a station are constructed in the same way as shown in FIG. 1. Station STj 107 is associated with a processing member Pj 106 and station STj+n 117 is associated with a processing member Pj+n 116. Processing members 106 and 116 are respectively connected to read/write memories Mj 105 and Mj+n 115 in which are stored microprograms required to transfer data between the stations. The processing member associated with station STj is formed by: a control circuit Cj 102 which contains all the logic means required to process microprograms contained in memory Mj 105 and which is coupled to input/output circuit ESj 103 to transfer data between station STj 107 and connecting channel 120; and an adapter circuit ABj 101 which connects connecting channel 120, on one hand to control circuit Cj 102, and, on the other hand, to the memory access circuit AMj 104 which is connected to memory Mj 105. Hence, in the system of FIG. 1 there is no central controller but all of the stations contain the same connecting module which enables any one of them to selectively become a master or slave station.

Figure 2:
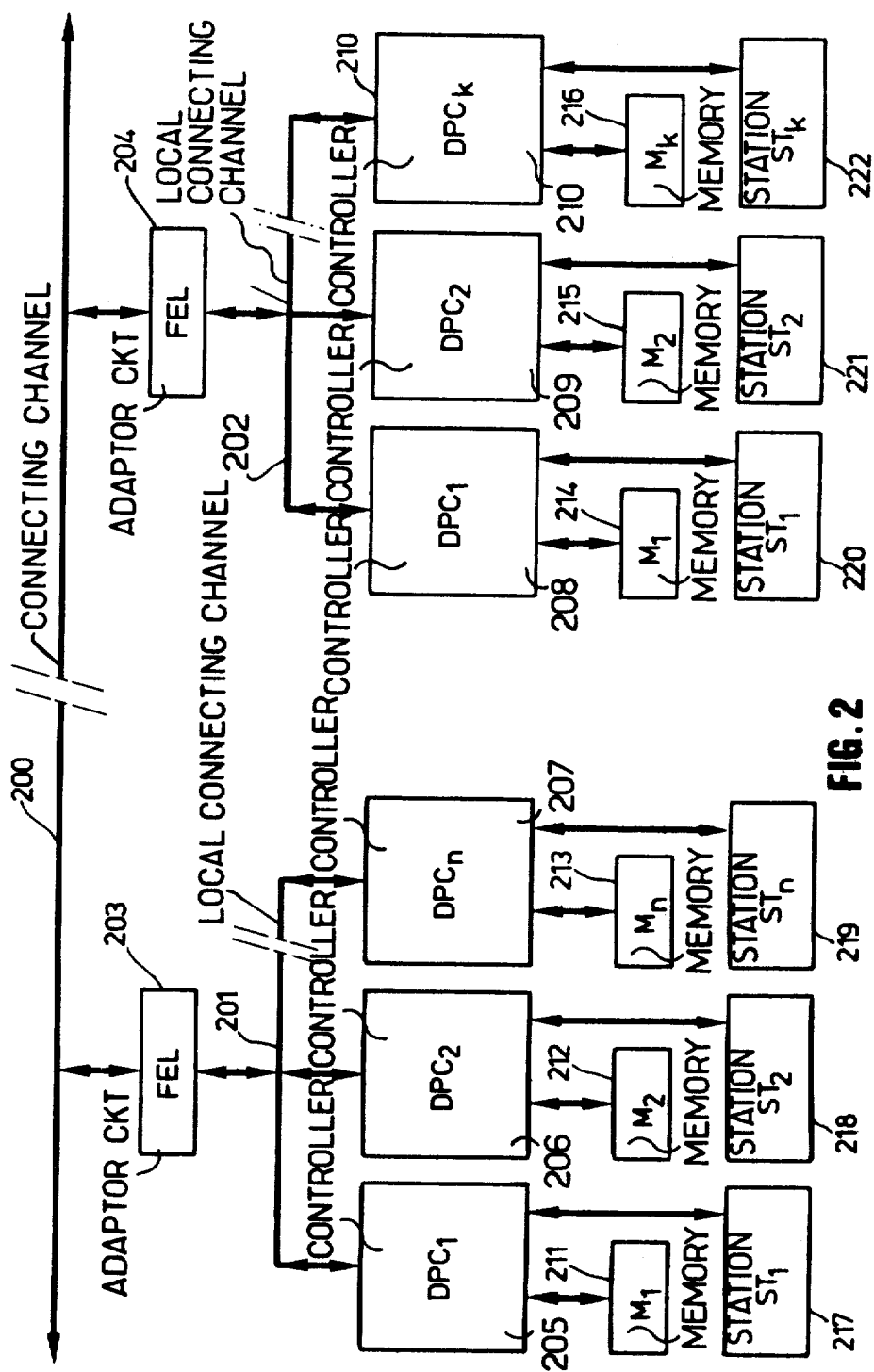
FIG. 2 is a block diagram of the same non-centrally controlled data-processing installation when incorporating the arrangements which are the subject of the present invention.

In FIG. 2 there is illustrated a non-centrally controlled data-processing installation of the type illustrated in FIG. 1, in combination with the apparatus which is the subject of the present invention. There are two separate sets of closely spaced stations including a first set of stations ST1 217-STn 219 and a second set of stations ST1 220-STk 222; the two sets communicate via a connecting channel 200 which is shared by all the other separate sets of closely located stations, which are not shown. Any one station in a set of closely located stations is able to communicate with any other station forming part of the set via a local connecting channel for the set, e.g., channel 201 or 202, and via an adapter circuit FEL, e.g., 203 or 204, only one of which is provided for and connected to the local connecting channel. Any one station in a set of closely located stations is able to communicate with any other station in another set of stations different from the first set via connecting channel 200 and the adapter circuit FEL of the set of stations; circuit FEL connects the station to connecting channel 200 which is shared by all the sets of close stations.

In FIG. 2 stations ST1 217, ST2 218, STn 219 communicate with each other via local connecting channel 201, and stations ST1 220, ST2 221, STK 222 communicate with each other via local connecting channel 202. Conversely, any one of stations ST1 217, ST2 218, STn 219 is able to communicate with any one of stations ST1 220, ST2 221, STK 222 via local connecting channels 201 and 202 and connecting channel 200. Circuit FEL 203 provides signal adaptation between local connecting channel 201 and connecting channel 200, while circuit FEL 204 provides signal adaptation between local connecting channel 202 and connecting channel 200. Each station has associated with it a connecting channel controller DPC which contains all the logic means required to process microprograms contained in an associated memory M. The associations between the several stations and connecting channels are illustrated on FIG. 2 as: (ST1 217, DPC1 205, M1 211): (ST2 218, DPC2 206, M2 212); (STn 219, DPCn 207, Mn 213); (ST1 220, DPC1 208, M1 214); (ST2 221, DPC2 209, M2 215); (STK 222, DPCK 2109, MK 216).

Figure 3:
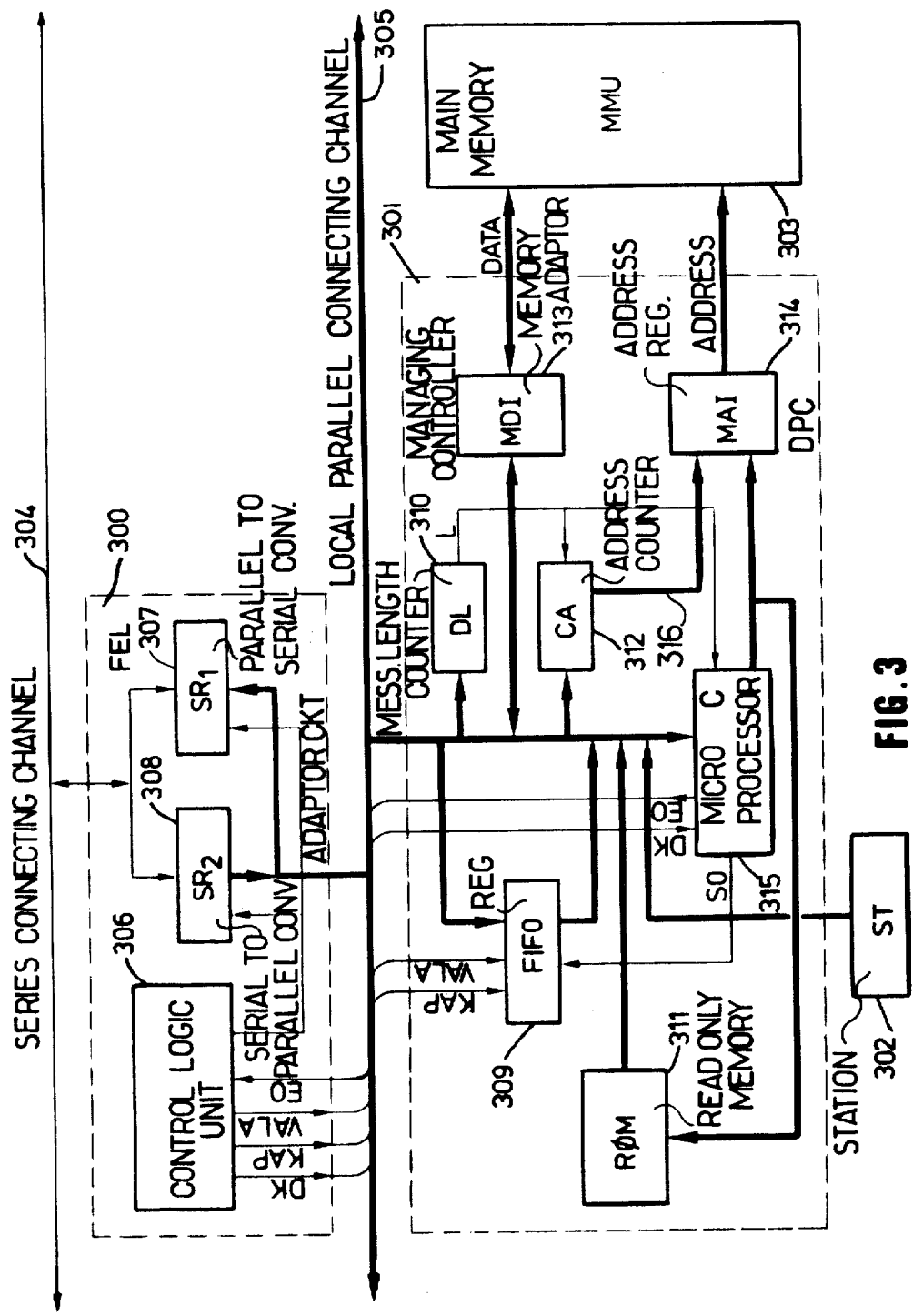
FIG. 3 is a block diagram of the logic adapting circuit FEL which is the subject of the present invention; the circuit is connected on the one hand to a local connecting channel and on the other to the channel for connecting the sets of remote stations.

In FIG. 3 there is illustrated the connection interface between circuit FEL 300 (that corresponds with one of circuits FEL 203 and 204) and managing controller DPC 301, that corresponds with one of controllers 205–210; both circuits 300 and controller 301 are connected to local connecting channel 305, that corresponds with one of channels 201 and 202.

Circuit FEL 300 contains a control logic unit 306 and converters SR1 307 and SR2 308 for arranging messages in series or in parallel on series connecting channel 304 or local connecting channel 305. Parallel to serial converter SR1 307 includes parallel inputs responsive to messages from local connecting channel 305 and retransmits them along connecting channel 304 in a series transmission mode. Serial to parallel converter SR2 308 includes a single input responsive to sequential bits derived in a series transmission mode from series connecting channel 304. Converter SR2 308 retransmits the series bits to local connecting channel 305 in a parallel transmission mode.

Managing controller DPC 301 selectively receives or retransmits messages coupled to it by any one of: station 302, adapter 300 and local connecting channel 305. Messages coming from circuit FEL 300 are received by DPC 301 in shift register FIFO 309 which operates on the "first in first out" principle. Register FIFO 309 retransmits the messages to a microprocessor C 315 and to a memory adapter MDI 313 which retransmits the data contained in the message to an address in main memory MMU 303 that is specified by address register MAI 314. Microprocessor 315 is connected to supply signals to register 314, message length counter DL 310 and an address counter CA 312; microprocessor C 315 supplies signals to address register MAI 314 until message length counter DL 310 has counted down and an L output signal is supplied by counter 310 to the microprocessor. Alternatively, length counter DL 310 and address counter CA 315 may supply signals to register MAI 314 to address memory MMU 303 directly via the local connecting channel 316 until an L output signal is derived from counter DL; in such a case microprocessor C 315 is not called.

Recognition and processing of messages is the responsibility of the microprocessor C 315 and read only memory ROM 311 which contains the microprograms required to handle each type of message. Messages transmitted along local connecting channel 305 between circuit FEL 300 and DPC 301 are synchronized by the control logic unit 306 in circuit FEL, which generates signals VALA, KAP and DK and supplies them via three leads to the local connecting channel. Signals VALA, KAP and DK are respectively indicative of: (1) a message is about to be received by circuit FEL 300 from either of channels 304 or 305, (2) a message being coupled via channel 304 to a local DPC, i.e., a DPC connected to the FEL by channel 305, and (3) a message request from channel 305.

Figure 4:
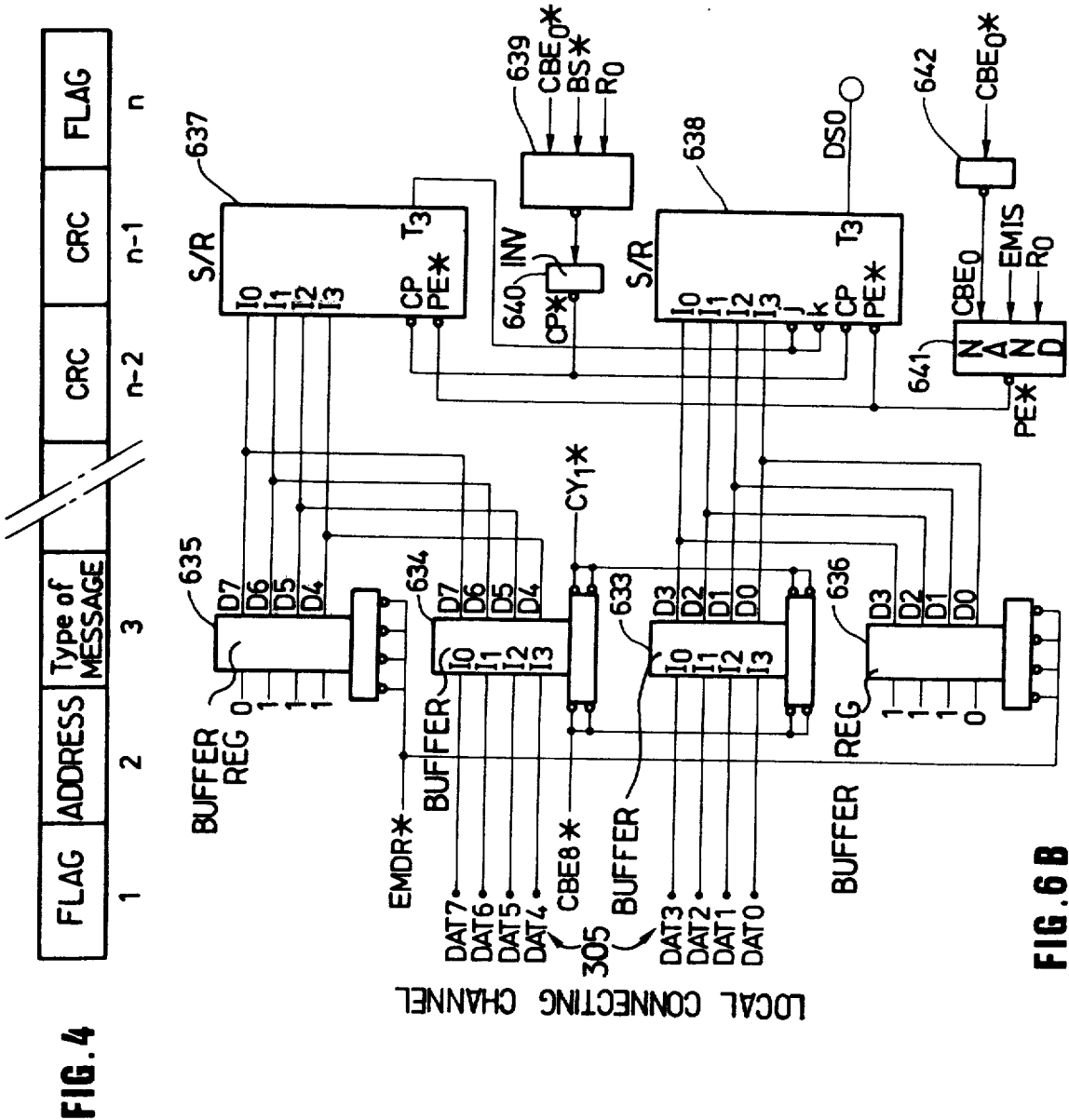
FIG. 4 is an illustration of the type-format of a message emitted by each DPC.

The format of a message is shown in FIG. 4, and includes n bytes, each of which has eight binary bits. The first byte (byte 0) represents a start flag and is made up of a digit sequence 01111110 that identifies the beginning and end of a message. The second byte indicates the eight bit address of which station on local connecting channel 305 or series connecting channel 304 is to transmit the message. The address values may apply to one particular station or indicate that one station is to transmit data simultaneously to all of the other stations. The third byte is divided into a pair of four bit codes to identify the type of message. One four-bit code, defining the first half of the byte, specifies to microprocessor C 315 the type of message being transferred between the stations. The other group of four bits, defining the second half of the byte, may have various meanings, as described infra. The fourth byte indicates the address of the emitting module, e.g., module 100 or 110 (which the receiver needs for addressing the reply). The contents of the fifth byte and the following bytes, to byte (n−2), depend on the type of message and indicate the data transferred between the stations. Two CRC bytes, at byte positions (n−2) and (n−1) are checking or parity bytes. Byte n is the end of message flag having the same code as that for the beginning of message.

When a transmitting DPC has command of series connecting channel 304 and the local connecting channel 305, microprocessor C 315 of the transmitting DPC derives an $E_0$ output signal that is coupled by local connecting channel 305 to circuit FEL 300; the $E_0$ signal causes control logic unit 306 to derive: (1) a signal VALA that is coupled via channel 305 to register 309 of the DPC 301 at each of the closely spaced stations, and (2) a beginning-of-message flag that is transmitted via the series connecting channel 304 to the DPC at the remote stations and that indicates a message is about to be transmitted by the adapter FEL 300 that derived the flag. Circuit FEL then derives signal DK that is transmitted at the beginning of each byte by local connecting channel 305 to the microprocessors C 315 in the DPC's at the close stations. Signal DK is accepted by the DPC at the close station having command and requests this DPC to transmit a byte. The requested DPC transmits a byte along local connecting channel 305; the byte is retransmitted by the local circuit FEL and coupled via channel 304 to the DPC at the remote, receiving station when control logic unit 306 of the local FEL derives a signal KAP; signal KAP is derived by the FEL at the end of each byte of a message except the start flag and an address byte. Signal KAP is coupled via channel 305 to register FIFO 309 in each of the local DPC's to enable those registers to supply bytes 2 . . . n to channel 305.

The beginning-of-message and end-of-message flags are recognized by the logic unit FEL which responds to them to generate signal VALA. In the case of a beginning of message, signal VALA goes high to enable all the FIFO's connected to the FEL by the local connecting channel 305 to be responsive to the message. The data bytes in the message which follow the flag are transmitted one after the other at a clock-rate determined by the bit rate of signal KAP which injects each received byte from channel 305 into register FIFO 309. FIFO 309 is dynamic and its output is asynchronous with respect to its input. DPC 301 responds to signal KAP and the parallel bits forming the first byte (byte 2) at the output of FIFO as soon as the first byte appears at the FIFO output, without waiting for all n bytes of the message to be loaded into the FIFO. Each DPC 301 reads the station number which is found in the first byte of the message to arrive, which is also the first of the bytes to emerge from FIFO 309. Recognition of the staion number is performed by a microprogram in memory 311 at each DPC. When a DPC identifies the station number contained in byte 2 of the message as its own, microprocessor C 315 generates signal S0 so that it reads the next byte (byte 3) contained in FIFO 309; signal S0 shifts the message in register FIFO by one byte.

The first half of byte 3 specifies which of the various types of messages is to be transmitted while the second half of the byte provides location instructions; the manner in which these various types are processed will now be considered. Initially, assume that the first half of byte 3 indicates a data transfer message (ITM) and the second half contains an index number. Microprocessor C 315 reads the third byte of the message from FIFO and, in response to the index number, searches its own memory for the length and the address of a buffer in the main memory MMU 303 where the message will be stored. The address of the buffer is fed into the address counter 312 and the length of the buffer is fed into the length counter 310, which is a backward counter. The address counter is responsible for address incrementing which is necessary when writing data into a selected buffer in memory MMU 303. Length counter 310 reports to microprocessor 315 any overflows which may occur. When all of the message has been transferred to the selected buffer in MMU 303, the DPC transmits a response message to the station which has transmitted and goes to the stand-by state to await the next transmission.

Next assume that the first half of byte 3 indicates that the contents of a buffer in main memory MMU are to be read (BRC); the BRC signal is used by a command station to ask another, slave station which is selected to transmit to the command station data contained in a specific buffer in the main memory of the slave station. The address of the buffer is given by an index number in the second half of byte 3. Using this index number, the microprocessor C in the DPC of the slave station, at the receiving end, searches its memory to determine the buffer address in the main memory of that DPC which contains the data to be transmitted. The buffer address and length of buffer are fed by microprocessor C to the address counter CA and backward lengthcounter LA. Address counter CA is responsible for address incrementing when reading out data contained in the selected buffer of main memory MMU. When the entire message has been transferred, the DPC of the command station, at the receiving end, emits a response signal and goes to stand-by for the next transmission, after handing over command to the next module.

Byte 3 may indicate that the type of message is a "POLL" message, in which case there is a command for transferring series connecting channel 304 from one station to another station; the address of the other station being contained in byte 2 of the message. When a station identifies the number contained in byte 2 of the message as its own and recognizes the "POLL" message, that station interrogates its microprocessor C 315 to determine whether a peripheral at station ST 302 or main memory MMU has supplied the microprocessor with a signal indicating that it has a message to transmit. If the answer is "no" the station hands over command of the series connecting channel 304 to the next station, the address of which is obtained by decrementing by one unit a register in microprocessor C 315 that stores the address of the station. Also, microprocessor C 315 derives a "POLL" message that is transmitted to the other FEL's by series connecting channel 304. If the answer is "yes" microprocessor C 315 identifies the address in main memory buffer where the data to be transmitted are situated and the microprocessor derives an ITM message that is transmitted to the other FEL's by the series connecting channel 304.

Finally, the third byte may indicate that the type of message is a response message from a receiver to an emitter; this may be a reception acknowledgement ACK or an indication that the station is busy, in which case the type of message is a "BUSY" message.

The dialogue between the stations takes place by interleaving the messages listed above on the series connecting channel 304, under the control of the microprograms contained in the read only memory ROM of each DPC. In the quiescent state, a station continuously monitors and scrutinizes the signals which arrive at the input to its DPC from the local connecting channel 305 in search of a message which bears its own address. There are only three eventualities in which the station may come out of the quiescent state:

1. The message received is a "POLL" message;
2. The message received is an "ITM" message;
3. The message received is a "BRC" message.

When a station has received a "POLL" message it takes over command. In the other two cases it becomes a slave. In all three cases the DPC of the station ignores an incoming message unless it is in the correct format, i.e., with the correct CRC bits.

When an ITM message arrives, the addressed station, i.e., first station, transmits a reply message to the station which has just transmitted, i.e., second station, whose address is found in the byte 4 of the ITM message. If the buffer of memory MMU indicated in the second half of byte 3 is available and the message is in the correct format, the reply from the addressed station as derived from microprocessor C 305 is ACK; the ACK signal is coupled back to the second station via channel 305. If the buffer selected is not available the microprocessor derives a "BUSY" message that is transmitted back to the second station. If the message received is incorrect (a CRC byte wrong) there is no reply.

The transmitting (second) station reports to its microprocessor C 315 the safe arrival of the ITM message at the first station when the second station receives the ACK message from the first station which has received the ITM message; then the second station hands over command to the next station and immediately thereafter reverts to the quiescent state.

When an addressed station receives a message wherein byte 3 indicates a "POLL" message, that station takes command both of the local connecting channel 305 and of the series connecting channel 304 so as to go into one of three sequences of operations; the selected sequence depends on signals loaded into the memory of microprocessor C 315 at the addressed station. The selected sequence may be one of:

1. The "POLL" sequence if microprocessor C 315 wants nothing done;
2. The ITM sequence if microprocessor C 315 asks for it;
3. The "BRC" sequence if microprocessor C 315 asks for it.

A station in command which does not need either the series connecting channel 304 or its local connecting channel 305 transmits a "POLL" message to the next station, i.e., the station having an address one less than that of the station in command; the next station address is obtained by decrementing the address of the station in command by one. If the address of the station in command is 0, the address of the next station is the highest numbered address. The station in command continues to monitor activity on the line after transmitting the "POLL" message. As soon as activity is detected the station in command reverts to the quiescent state. if, at the end of a predetermined time after transmission of the "POLL" message, no activity has been detected on channel 304 or 305 by microprocessor C 315 of the command station, the command station microprocessor initiates a fresh "POLL" sequence with a new address, the new address being obtained by decrementing the previous address by 1. If the previous address is 0, the updated address is the highest numbered address.

Figure 5:
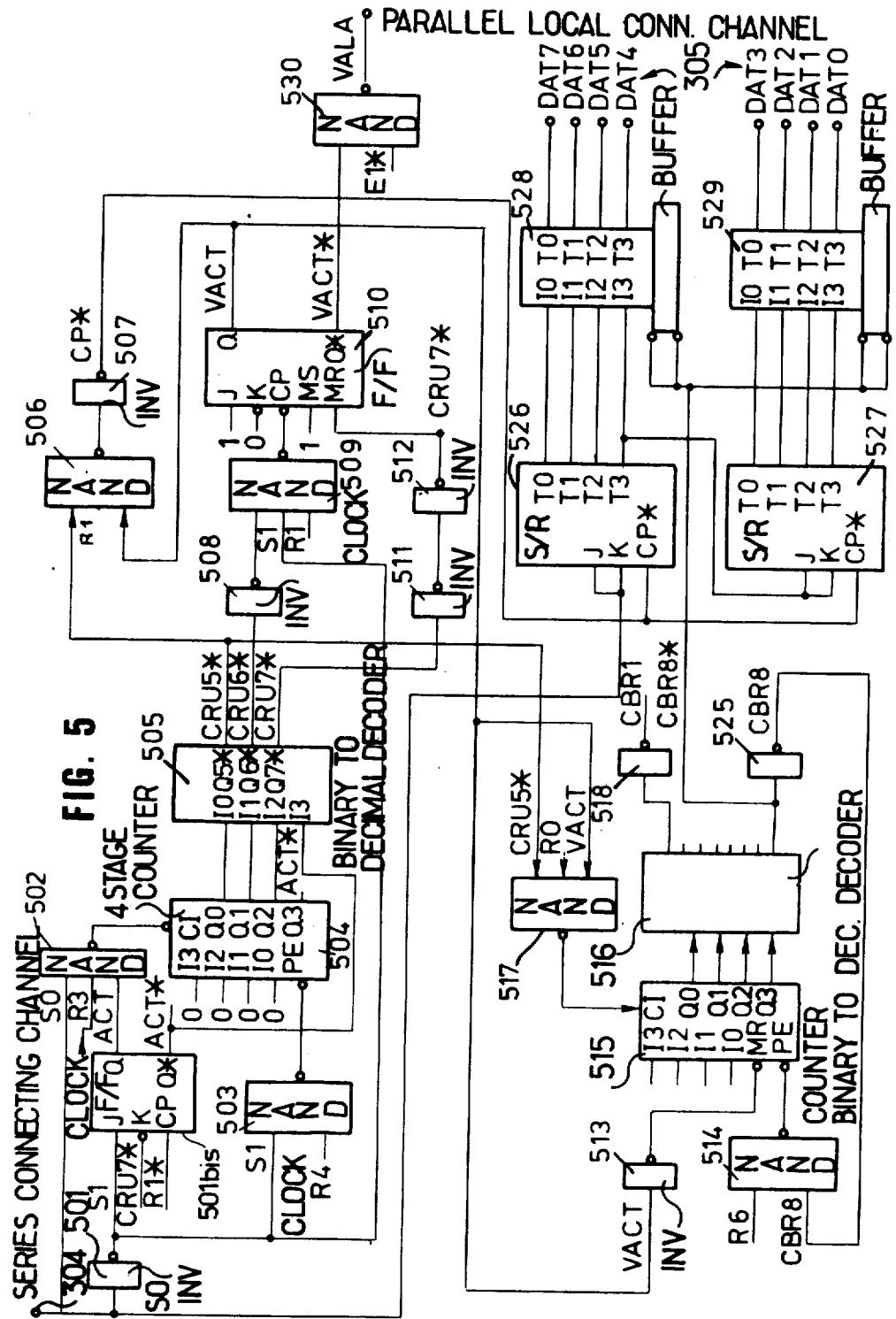
FIG. 5 is a circuit diagram of the reception circuits of the logic adapter FEL which is the subject of the present invention.

In FIG. 5 there is illustrated a specific embodiment of the reception section SR2 308 of the circuit FEL for adapting local channel 305 to series channel 304 and a portion of control logic circuit 306.

Initially consider the apparatus for detecting the reception by circuit FEL of start and stop flags 01111110 on channel 304. Messages coming from series connecting channel 304 are received at input S0 of inverter 501, having an output which is connected to the J input of JK flip-flop 501 bis. In response to the first bit received at input S0 being a 0, as occurs at the start of the beginning-of-message flag, inverter 501 applies a logic 1 to the J input of JK flip-flop 501 bis whereby a 1 is derived at the Q output of flip-flop 501 bis to generate a signal ACT which signifies that the series connecting channel is active. Signal ACT enables inputs S0 and R3 of NAND gate 502; input S0 receiving signals from series connecting channel 304 and input R3 receiving a clock signal. The output of NAND gate 502 is connected to the count input CI of four stage counter 504; the count in counter 504 advances one unit each time input S0 of NAND gate 502 goes to logic 1 simultaneously with the derivation of clock R3 while the gate is enabled by ACT. The four stages of counter 504 are selectively responsive to logic 0's coupled by bias sources to parallel inputs I0–I3 of the counter; inputs I0–I3 are enabled by input PE being driven by NAND gate 503, having one input responsive to a clock signal R4 and another input responsive to a signal S1 (derived from the output of inverter 513) for enabling the clock signal. Thus, when a 0 is detected on series connecting channel 304, signal S1 assumes the value 1 and the parallel inputs I0–I3 of counter 504 are enabled via input PE of the counter, thus resetting the four stages of the counter to zero.

Outputs Q0–Q2 of counter 504 are connected to inputs I0 to I2 of a binary to decimal decoder 505, having eight outputs Q0*–Q7*, of which only outputs Q5*, Q6* and Q7* are used, to derive signals CRU5*, CRU6*, CRU7*, respectively. Input I3 of decoder 505 is responsive to the output signal ACT* of flip-flop 501 bis; the signal is zero when series connecting channel 504 is active to enable outputs Q0*–Q7* of decoder 505. Signal CRU5* is a logic 0 only when counter 504 has counted five consecutive 1 bits coming from input S0 and is a 1 in other cases. Signal CRU5* is applied to one input of NAND gate 506, having two other inputs respectively responsive to signal VACT from the Q output of flip-flop VACT 510, and clock signal R1. The output of NAND gate 506 is applied to the input of inverter 507 to generate a signal CP* for controlling the reception of subsequent bytes by circuit FEL from channel 304. Signal CRU6*, from decoder 505, is applied to the input of inverter 508, having an output which drives one input of NAND gate 509, having two other inputs respectively responsive to the signal S1 from the output of inverter 501 and the clock signal R1. The output of NAND gate 509 is applied to a clock input (CP) of JK flip-flop 510, the J and K inputs of which are respectively biased at 1 and 0. Thus, when counter 504 has counted six consecutive 1 bits, as occurs during a start flag, output CRU6* of decoder 505 goes to logic 0 to enable the input of NAND gate 509 so it is responsive to a zero derived on channel 304; the binary zero at channel 304 (the last bit of the start flag) is coupled to gate 509 by inverter 501. In response to the last bit of the start flag, gate 509 derives an output that is applied to input CP of flip-flop 510, to drive the flip-flop to the one state. Signal VACT, thereby derived by the Q output of flip-flop 510, goes to the 1 state to enable the input of NAND gate 506, thus allowing the clock signal R1, at the input of gate 509, to control derivation of the signal CP*, at the output of inverter 507. CP* is derived each time clock pulse R1 is derived until a stop flag is derived on channel 304 and detected by inverters 501, 507, and 508, flip-flops 501 bis and 510, NAND gates 502, 503, 506 and 509, counter 504, and decoder 505.

An indication that a message is being received by FEL 300 from channel 304 is transmitted to local channel 305 by flip-flop 510 supplying a VACT* output to NAND gate 530 which is also responsive to an E1* signal to derive a VALA output. As seen infra, E1* indicates the most recently derived value of E0, as derived from a DPC connected to local channel 305.

Signal VALA thus assumes the value 1 when a message is transmitted to FEL 300 and reproduces, on the local connecting channel 505, the previous state, E1, of the transmitting DPC.

When it is desired to terminate operation of FEL 300 prior to completion of a message, e.g., when a line is broken in the middle of a message, seven consecutive 1's are derived on line 304, causing signal CRU7* to be generated by output Q7* of decoder 505. Signal CRU7* passes through two inverters 511 and 512 to the zero reset input MR of flip-flop 510. Thus, when counter 504 has detected seven consecutive 1 bits, flip-flop 510 causes signal VACT to go low to inhibit signal CP* which controls bit reception. Flip-flop VACT 510 normally returns to zero when the end of message flag 01111110 is applied to its input CP.

The binary one value of signal VACT, which occurs when channel 304 is feeding a message to FEL 300, enables the serial binary bits on channel 304 to be decoded and transformed into parallel bytes that are coupled to channel 305. To this end, VACT enables clock input R0 and input CRU5* of NAND gate 517, having an output which is connected to count input CI of counter 515. The outputs of counter 515 are connected to the inputs of binary to decimal decoder 516, having eight decimal indicating outputs which are respectively connected to eight inverters 518 . . . 525 (only inverters 518 and 525 being illustrated) that derive bit-reception controlling signals CBR1 to CBR8 in succession at a rate determined by clock signal R0. When decoder 516 detects the eighth state of counter 515 at the completion of a byte, the decoder derives signal CBR8 that is applied to the input of NAND gate 514. Gate 514 responds to CBR8 to reset counter 515 to zero (when clock R6) is applied to gate 514); the counter then being again ready to count eight additional bits for a new byte.

Circuits 526 and 527 are four bit shift registers which store the eight sequential bits in a byte coupled to channel 304 and enable the byte to be coupled to channel 305. The clock or shift inputs CP* of registers 526 and 527 receive the output of inverter 507, which duplicates clock signal R1 when signal VACT is present to enable the signal S0 received from channel 304 to be series-loaded into shift registers 526 and 527. The fourth bit location of register 526, at output T3, is connected to the JK inputs of the second register 527 so that the eight sequential bits of a byte received at input S0 are loaded successively into shift registers 526 and 527 and the byte is divided into two ½ bytes at the outputs T0 to T3 of the registers. The lowest order bit, i.e., the first bit in a byte, is situated at stage T3 of register 527, while the highest order bit, i.e., the last bit in a byte, is found at stage T0 of register 526. Gated buffers 528 and 529 connect the outputs of shift registers 526 and 527 to local connecting channel 305 at the moment the eighth position of counter 515 is detected, when signal CBR8 goes to zero. Inputs I0 to I3 of each of buffers 528 and 529 are connected respectively to be responsive to outputs T0 to T3 of shift registers 526 and 527.

From the above description, the treatment of the signals arriving from series connecting channel 304 may be summarized as follows.

The arrival of a zero from series connecting channel 304 is detected in logic unit FEL by flip-flop 501 bis, which derives "line active" signal ACT. Signal ACT then enables the input of counter 504, which counts all the successive 1's transmitted along series connecting channel 304. As stated supra, the beginning-of-message flag consists of six consecutive one bits between two zero bits. The flag is detected by decoder 505, whose output CRU6* goes to the 0 state in response to reception of the sixth consecutive 1 bit. Detection of the sixth bit sets flip-flop 510, causing signal VACT to be derived, whereby subsequent bits received on series connecting channel 304 are coupled into shift registers 528 and 529 and transferred in parallel to local connecting channel 305 in response to the derivation of signal CBR8 by inverter 525. The binary one value of signal VACT is reflected by signal VALA to all the local DPC's connected to channel 305, thus informing these DPC's that a beginning of message flag has been received by the FEL from channel 304. The DPC's then analyze the next byte received on channel 304 to read the station number. Precautions are taken, in particular, to ensure observance of the following rules.

When the reception circuit detects five consecutive 1 bits after detection of the start flag, counter 504 activates decoder 505 so that signal CRU5*, at the output of the decoder, goes to zero, thereby invalidating the signal CP* controlling bit reception. If the next bit is a zero, it resets counter 504 to zero via input S1 of NAND gate 503 and the byte concerned is accepted into shift registers 526 and 527. If the next bit is a 1, signal CRU6* assumes the value 0 to indicate that an end of message flag is involved; the CRU6* resets flip-flop VACT 510 to zero. This bit is also accepted by shift registers 526 and 527. If the next bit (bit 7) is again a 1, signal CRU7* assumes the value 0 and resets the "line-active" flip-flop ACT 501 bis through a connection from decoder 505, and inverters 511, 512 to the J input of the flip-flop 501 bis. Thereby, signal CBR8 is not derived and further bytes in the message are not transmitted to the local connecting channel 305.

Figure 6A:
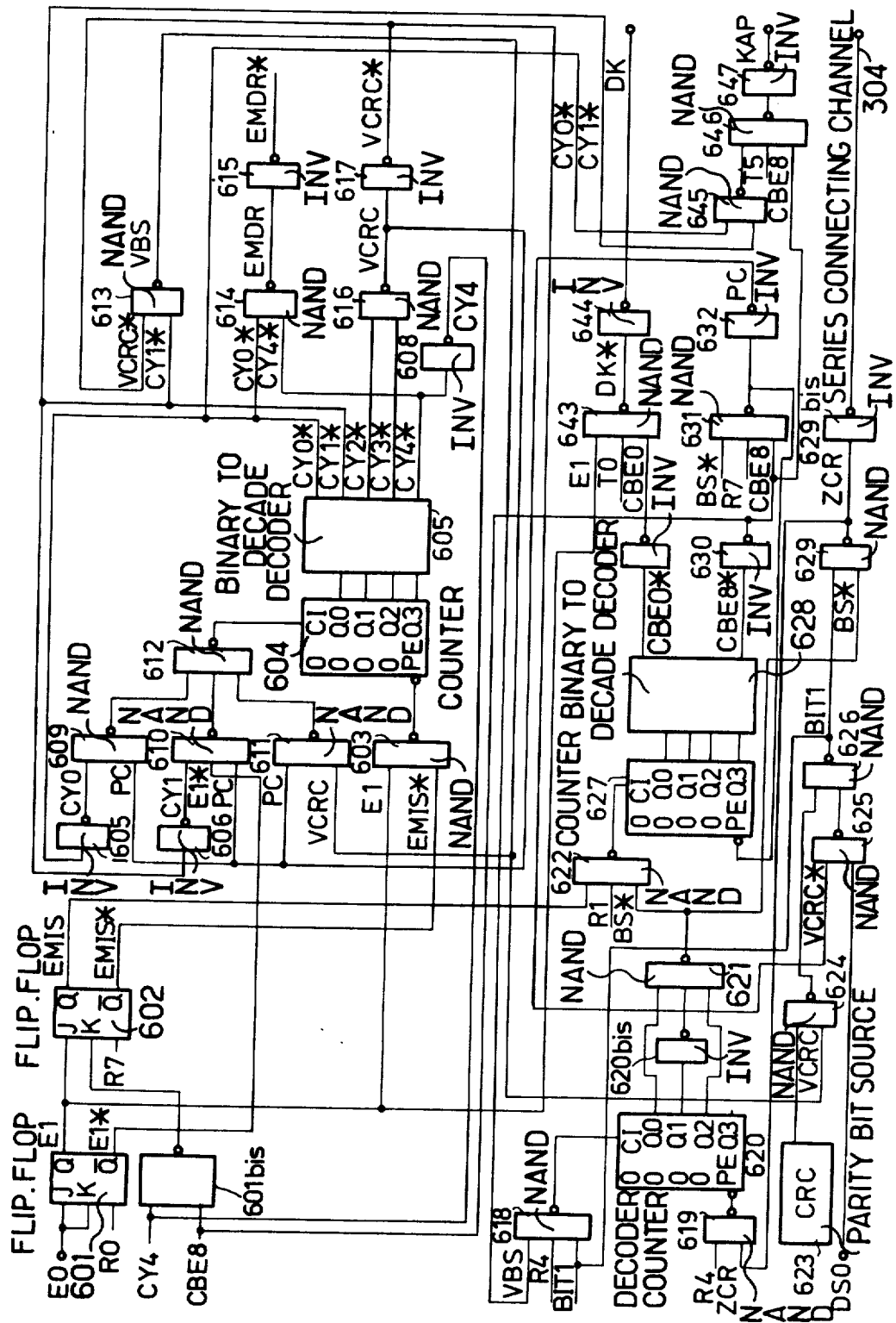

In FIGS. 6A and 6B there is illustrated an embodiment of transmission section 307 of circuit FEL 300 for modifying the parallel signal on channel 305 so it can be transmitted as a serial signal on channel 304, as well as the remainder of control logic 306.

To initiate operation of circuit 307, a transmission command signal E0 derived from microprocessor 315 of one of the control modules 306 is applied to the J input of JK flip-flop 601 to set that flip-flop. The Q output of JK flip-flop 601 derives a signal E1 which is coupled to the J input of a JK flip-flop 602 to set flip-flop 602 to the 1 state, whereby signal EMIS is derived from the Q output of flip-flop 602. Since signal E1 occurs before signal EMIS, the input conditions set by NAND gate 603 are satisfied by E1 and EMIS* to enable the four parallel, binary zero inputs of byte number counter 604 to be applied to the four stages of the counter. Counter 604 is thus reset to zero at the moment the circuits in FIGS. 6A and 6B are about to transmit. When signal EMIS is derived immediately after counter 604 has been reset, input PE of counter 604 no longer enables the parallel inputs to the counter and the counter 604 state can be advanced in response to pulses supplied once each byte to its input C1 which is connected to the output of a three input NAND gate 612. Outputs Q0, Q1, Q2 and Q3 of the four stages of counter 604 are connected to the inputs of a binary to decade decoder 605, the outputs of which derive states CY0*, CY1, CY2*, CY3*, CY4*, which sequentially assume the value 0 in the order 0 1 2 3 4 each time the state of counter 604 is advanced one unit in response to the output of gate 612. Outputs CY0* and CY1* are respectively connected to the inputs of inverters 1605 and 606 to derive their complementary signals. Signal CY0 is applied to the input of NAND gate 609, having another input which receives an enabling signal PC. Signal CY1 is applied to an input of NAND gate 610 having another input responsive to enabling signal PC. NAND gate 611 has an input responsive to enabling signal PC and another input responsive to signal VCRC, derived by the output of NAND gate 616, having a pair of inputs separately responsive to signals CY2* and CY3*. The outputs of NAND gates 609, 610 and 611 form the inputs of NAND gate 612.

When counter 604 is at zero, output CY0* is at zero to enable one input of NAND gate 612. When signal PC is derived in a manner described infra, NAND gate 609 drives NAND gate 612 which in turn advances counter 604 to state 1 which is detected by decoder 605; CY1* thereby goes to zero to enable the input of NAND gate 610. When signal E0 at the input of JK flip-flop 601 goes to zero, signal E1* at the $\overline{Q}$ output of JK flip-flop 601 goes to 1 to enable the E1* input of NAND gate 610. When signal PC is present the resulting output of gate 610 advances counter 604 by one unit to state two which is detected by decoder 605; thereby CY2* goes to zero. The signal VCRC which enables NAND gate 611 and derived by NAND gate 616 is at logic 1 when CY2* or CY3* is present, that is to say counter 604 indicates bytes 2 and 3 are being coupled from channel 305 to channel 304. When one or the other of these two conditions is satisfied, counter 604 advances by one unit in response to signal PC.

Four stage counter 627, which drives binary to decade decoder 628, counts the transmitted bits within each byte, except for the bits in the start and stop flags. Binary to decade decoder 628 decodes nine states CBE0* to CBE8* from counter 627. Counter 627 is advanced by the signal which is coupled to its input C1 by NAND gate 622, which in turn in responsive to clock signal R1, signal EMIS (from JK flip-flop 602) and a signal BS* produced by NAND gate 621.

Signal BS* is derived in response to five consecutive binary 1 bits being derived during a byte and causes the next bit in the byte to be a binary zero so that an end of message flag is not erroneously inserted into the bit stream transmitted on channel 304. The BS* signal is derived from gate 621 in response to four stage counter 620 being at state five since the inputs of the gate are responsive to the Q0 and Q2 output counter of the signals and the Q1*, counter signal, as derived from inverter 620 bis. Counter 620 is advanced by the signal coupled to its input C1 from NAND gate 618. NAND gate 618 has one input responsive to signal VBS from the output of NAND gate 613, a second input responsive to signal BIT1 which is derived by NAND gate 626, and at a third input responsive to clock signal R4. Signal PC is derived by inverter 632, having an input responsive to the output of NAND gate 631, which in turn is responsive to output signal BS* from NAND gate 621, output signal CBE8 from inverter 630, and clock signal R7.

During parity bytes (n-2) and (n-1) signal BIT1 is derived at the output of NAND gate 626, having inputs responsive to the outputs of NAND gates 624 and 625. NAND gate 624 is responsive to cyclic redundancy checking, i.e., parity, bits sequentially derived from source CRC 623 and output signal VCRC of NAND gate 616.

NAND gate 625 is responsive to output signal VCRC* of inverter 617 and the flow of bits DS0 which represents the flag and data transmitted. The flow of bits is transmitted to series connecting channel 304 by NAND gate 629 having inputs responsive to signal BIT1 and the signal BS* from the output of NAND gate 621. Signal ZCR, at the output of gate 629 and indicative of the signal coupled to channel 304, resets four stage counter 620 to zero via NAND gate 619.

Input DS0 of NAND gate 625 is responsive to the flow of bits from cascaded shift registers 637 and 638 (FIG. 6B), the contents of which are sequentially read out via output T3 of shift register 638. Output T3 of shift register 637 drives the J and K inputs of shift register 638. Inputs 10–13 of registers 637 and 638 are respectively responsive to parallel data bits D0–D7 to be transmitted, and which are derived on local channel 305. Data bits D0–D7 are coupled from channel 305 to registers 637 and 638 in response to the derivation of signal CP*. Signal CP* is derived from inverter 640, the input of which is responsive to the output of NAND gate 639, in turn driven by signal CBE0* (from output CBE0* of binary to decimal decoder 628), signal BS* from NAND gate 621, and clock signal R0.

Buffer registers 635 and 636 derive the start and stop flag bits 01111110 when they are enabled by a signal EMDR* from inverter 615. Code digits 0111 are respectively applied to inputs 10–13 of buffer 635, while code digits 1110 are respectively applied to inputs 10 and 13 of buffer 636. Outputs D0 to D3 of buffer 636 are connected to the input side of shift register 638, while outputs D4 to D7 of buffer 635 are connected to the input side of shift register 637.

Inputs 10-13 of buffer 633 and inputs 10-13 of buffer 634 are respectively responsive to data lines DAT0 to DAT7 of local connecting channel 305. The data present on local connecting channel 305 is coupled by buffers 633 and 634 to the inputs of shift registers 637 and 638 when the buffers are enabled by output signals CY1* and CBE8* of decoders 605 and 628 respectively.

A byte request signal DK is derived from NAND gate 643 (FIG. 6A) and transmitted by FEL along local connecting channel 305. Gate 643 is responsive to signal E1 from flip-flop 601, the signal CBE0 from decoder 628 and a clock signal T0 to derive signal DK when all of these signals are received at the input of the gate. Hence, signal DK indicates that a microprocessor 315 at one of the local stations has derived an E0 command signal and that the first bit of a byte is being derived. The DK signal controls microprocessors C315 to enable the DPC's to execute the operations discussed supra.

A byte coming signal KAP is derived from the output of inverter 647, having an input responsive to NAND gate 646 that has one input connected to the output of a NAND gate 645 having two inputs which receive signals CY0* and CY1*. NAND gate 646 is also responsive to clock signal T5 and signal CBE8 which is extracted from the output of inverter 630. Hence signal KAP is derived at the end of every byte except during the BRC bytes and the flag byte at the end of the message. Signal KAP is coupled to registers FIF0 309 to control read in and read out of parallel bit bytes to the register after it has been enabled by signal VALA.

From the foregoing it can be seen that the transmission of data from local connecting channel 305 to the series connecting channel 304 takes place as follows. When one of the controllers, e.g DPC 301 wishes to transmit, it emits a signal E0 which activates JK flip-flop 601, so that it derives signal E1. Signal E1 initially causes the start flag 01111110 to be derived by resetting counter 604 to zero via NAND gate 603, whereby state CY0* is derived by decoder 605 and signal EMDR* is derived by inverter 615 to unblock buffers 635 and 636 so that the start flag bits 01111110 are transferred from the inputs of the buffers to the parallel inputs of shift registers 637 and 638. Signal E1 also causes signal VALA to be transmitted to local connecting channel 305 to all the DPC's connected to the channel, by enabling NAND gate 530 in FIG. 5. Then, one clock period later, flip-flop 602 derives signal EMIS. Counter 627 was set to zero at the end of the previous message by signal CBE8* and at the time when a fresh message begins decoder 628 detects state CBE0*. Similarly, when a fresh cycle begins, counter 620 is at zero, outut BS* of NAND gate 621 is at 1 and counter 627 is advanced at a rate dictated by the clock signal R1, the states of the counter appearing in succession as signals CBE0*-CBE8*. At the instants clock pulses R0 occur while states CBE0* and BS* are derived, signal CP* is generated at the output of inverter 640 to enable the parallel inputs of register 637 and 638, whereby the start flag is transferred to shift registers 637 and 638. In response to the next clock pulse (R1), output PE* of NAND gate 641 enables the clock input CP of shift registers 637 and 638 and the flag bits contained in registers 637 and 638 are shifted by one step, and the first bit of the flag, i.e., the lowest order bit, is derived from output DS0 of register 638. Then, the first flag bit, having been validated by signal VCRC* at the input to NAND gate 625, is derived from gate 629 as signal ZCR and fed to series connecting channel 304. The next seven flag bits follow at the rate dictated by clock signal R0.

When the flag bit is transmitted, that is, when decoder 628 detects state CBE8* and signal CBE8 is derived at the output of inverter 630 while clock pulse R7 occurs, signal PC is derived by inverter 632 and is coupled to NAND gate 609 to advance counter 604 by a count of one to indicate transmission of byte 2, indicative of the address of the station called by the DPC which is retrieved from the DPC by its microprocessor 315C. Decoder 605 then detects state CY1*, which causes signal VBS to be derived at the output of NAND gate 618. The derivation of CY1* and CBE8 enables byte 2, present on the local connecting channel 305, lines DAT0-DAT7, to be transferred to buffers 633 and 634. The data bit contents of buffers 633 and 634 are respectively supplied to registers 637 and 638 under the control of signal CBE0*, which is reset to zero when counter 627 is reset to zero by signal CBE8* which is coupled by the output of NAND gate 631 to input PE of counter 627. For the next eight states, CBE01 to CBE08, of decoder 628, the eight bits contained in shift register 637 and 638 are sequentially transmitted bit by bit (one bit for each state of counter 627) to output DS0 of shift register 638. Decoder 605 is maintained at state CY1* during bytes 2 . . . (n-3) so that during this interval there is a flow of series bits transmitted by NAND gates 625, 626 and 629 to series connecting channel 304.

To prevent a stop flag, i.e., a byte having six consecutive ones from being erroneously coupled to channel 304, regardless of the bits derived by decoder 628 during bytes 2 . . . (n-2) and (n-1), but not byte n, counter 620 (during this interval) detects the occurrence of five consecutive binary ones in the signal to be applied to channel 304 and automatically causes the sixth bit to be a zero. To this end, input C1 of counter 620, which is controlled by NAND gate 618, advances the counter by a count of one each time a 1 bit appears at output DS0 of shift register 638. When counter 620 has counted five consecutive 1 bits, signal BS* at the output of NAND gate 621 reverts to zero, to stop the progress of counter 627 for one clock period and apply a 0, passing bit to series connecting channel 304. Signal ZCR goes to one to reset counter 620 to zero so that the next 1 bits may be counted. Resetting counter 620 to zero causes signal BS* to go to 1, whereby the cycle continues until signal CBE8* is derived at the end of the byte.

The padding bit can only be inserted by gates 621 and 629 into the signal of channel 304 after five consecutive 1 bits during periods when signal VBS is present at the input to NAND gate 618, that is, bytes 2 . . . (n-2) and (n-1) (but not bytes 1 and n) when states during CY1, CY2, and CY3 are derived from decoder 605. The end of CY1 is brought about in response to microprocessor 315C of DPC 301 (FIG. 3), deriving an output causing signal E0 to be reset to zero (indicative of the message being completed), whereby flip-flop 601 is reset and signal E1 goes low to enable the derivation by FEL 300 of parity bytes (n-2) and (n-1) and the end of message flags. The input to NAND gate 610 is then enabled by the transition in signal E1; the resulting output of gate 610 advances the state of counter 604 by a count of one, whereby state CY2 is derived at the output of decoder 605. Thereby, signal VCRC is set to 1, to enable the input of gate 624, so the output of parity signal generator CRC 623 is transmitted to series connecting channel 304 as the first CRC byte (n-2). Signal PC following transmission of the first CRC byte causes counter 604 to again advance by a count of one; the counter state is detected at CY3* by decoder 605 and the second CRC byte (n-1) is then transmitted along the series connecting channel 304. This is possible only because VCRC remains at logic 1 during the two consecutive states CY2* and CY3*.

When the next PC signal is received at the input of NAND gate 611, counter 604 is again advanced by a count of one so that decoder 605 derives output CY4*, which enables the end of message flag to be derived. In response to signal CY4*, at the input of NAND gate 614 going to 0, signal EMDR*, at the output of inverter 615, goes to 1 and buffers 635 and 636 are enabled; these buffers then transmit the end-of-message flag (01111110) to shift registers 637 and 638. The end of message flag is then retransmitted to series connecting channel 304 at the rate dictated by signal CP*, which is derived from the output of inverter 640.

The description just given of the arrangement according to the invention represents only one possible embodiment. It is clear that those skilled in the art would be capable of producing other arrangements without thereby exceeding the scope of the invention.

What is claimed is:

1. Apparatus for controlling selective exchange of information between a plurality of closely located stations and at least one station remote from the closely located stations comprising a first data channel for connecting the closely located stations to each other so that signals are coupled between the closely located stations via the first data channel, a second data channel connected to the remote station, a common adapter circuit for the closely located stations, said adapter circuit including means for coupling signals between the first and second data channels so that signals are coupled between all of the closely located stations and the remote station via the first data channel, the adapter circuit and the second data channel; each of said stations including: a data module for coupling signals between one of the data channels and at least one peripheral device at that station, each of said modules including a data processing unit having a memory, each of said memories storing a program dependent on the configuration of peripheral devices at the station; each of the data processing units including: means for deriving an enabling order for a module at another station, said enabling order being coupled to the another station via at least one of the data channels, means for executing the program stored in the memory of the unit in response to an order derived by another unit and coupled to the unit of the station via at least one of the data channels, and means for controlling exchanges of signals between the units of each of the stations in such a way that selective exchange of signals between the stations is carried out by a succession of information exchange controls by the modules of all of the stations.

2. The apparatus of claim 1 wherein each of the closely located stations includes: a microprocessor having a read only memory for storing microprograms, and a controller having means connected to respond to signals from the first channel and controlled by the microprograms for interpreting the type of signal received and enabling the closely located stations to dialogue along the first channel.

3. The apparatus of claim 1 wherein the common adapter circuit includes: a logic adapting unit for controlling all signal exchanges which take place along the second channel proper and the first channel, circuits for transmitting and receiving messages along the second channel proper to the first channel, and a logic control unit connected on one hand to the first channel and on the other to said transmitting and receiving circuits for synchronizing messages coupled between the logic adapting unit and data module of each station connected to the first data channel.

4. The apparatus of claim 3 wherein the logic adapting unit includes circuits for receiving signals coming from the first channel, said receiving circuits including first means for detecting the presence of a signal on the first channel, second means responsive to the first means detecting the signal on the first channel for detecting a start flag at the beginning of a message, said second means deriving an enabling signal in response to the flag being correct, means for accepting messages arriving along the first channel when the enabling signal is derived so that the messages are retransmitted to the first channel, and third means connected to the said first means for detecting the presence of an end of message flag and for disabling the circuits for accepting the message in response to the end of message flag being detected.

5. The apparatus of claim 3 wherein each of the closely located stations includes: a microprocessor having a read only memory for storing microprograms, and a controller having means connected to respond to signals from the first channel and controlled by the microprograms for interpreting the type of signal received and enabling the closely located stations to dialogue along the first channel.

6. The apparatus of claim 5 wherein the logic adapting unit includes circuits for transmitting messages along the first channel, said transmitting circuits including: a first means connected via the first channel to each microprocessor associated with the controller at each of the other closely located stations for accepting the signal emitted from a microprocessor at the other closely located stations, whereby the controller associated with the microprocessor which emits an accepted signal is a managing controller, said first means being connected to a group of means for transmitting the beginning of a message flag along the first channel, second means connected to the first means for transmitting a character request signal along the first channel, third means connected to the first means for accepting the messages which are transmitted by a managing controller along the first channel and for retransmitting the messages along the first channel, and a group of fourth means connected to the first and third means for generating the end of message flag.

7. The apparatus of claim 1 wherein the means for controllling exchanges of signals includes means for enabling the module of a particular station to take command of the other modules and for enabling the particular module to become a slave, said last named means being responsive to signals derived from the modules of the other stations, said modules including means for deriving signals to transfer command to another module and for commanding other modules to become its slave.

8. Apparatus for controlling selective exchange of information between stations at plural locations comprising a data channel for connecting the stations at the plural locations to each other so that signals are coupled between the stations via the data channel, each location including: an adapter circuit, each of said adapter circuits being responsive to control signals from other locations as coupled to it via the data channel and to control signals from the location and including means for coupling signals between the data channel and at least one station at the location so that signals are coupled between several of the stations via the data channel and the adapter circuit at the location including the station, a data module for coupling signals via the adapter at the location between the data channel and at least one peripheral device at the location, each of said modules including a data processing unit having a memory, each of said memories storing a program dependent on the configuration of the peripheral devices at the station; each of said data processing units including: means for deriving an enabling order for a module at another location, said enabling order being coupled to the another location via the module at the location where the enabling order is derived, the data channel, and the module at the another location, means for executing the program stored in the memory of the unit in response to an order derived by a unit at another location and coupled to the unit of the location via the data channel and the adapter circuit at the location, means for controlling exchanges of signals between the units at each of the locations in such a way that selective exchange of signals between the stations is carried out by a succession of information exchange controls by the modules at all of the locations, the means for controlling exchanges of signals including means responsive to signals derived from the modules of the other locations for enabling the module of any location to take command of the other modules or for enabling the module at any location to become a slave, said modules including means for deriving signals to transfer command to a module at another location and for commanding modules at other locations to become its slave.

* * * * *